(12) United States Patent
Osawa

(10) Patent No.: US 11,059,189 B2
(45) Date of Patent: Jul. 13, 2021

(54) ARM DRIVING APPARATUS

(71) Applicant: Sony Interactive Entertainment Inc., Tokyo (JP)

(72) Inventor: Hiroshi Osawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/314,082

(22) PCT Filed: Jul. 5, 2017

(86) PCT No.: PCT/JP2017/024629
§ 371 (c)(1),
(2) Date: Dec. 28, 2018

(87) PCT Pub. No.: WO2018/008679
PCT Pub. Date: Jan. 11, 2018

(65) Prior Publication Data
US 2019/0248026 A1 Aug. 15, 2019

(30) Foreign Application Priority Data
Jul. 5, 2016 (JP) .............................. JP2016-133704

(51) Int. Cl.
*B25J 18/04* (2006.01)
*B25J 17/00* (2006.01)
(Continued)

(52) U.S. Cl.
CPC ................. *B25J 18/04* (2013.01); *B25J 9/02* (2013.01); *B25J 9/102* (2013.01); *B25J 17/00* (2013.01); *B25J 17/0283* (2013.01)

(58) Field of Classification Search
CPC .... F16H 57/038; F16H 55/22; F16H 57/0483; B25J 18/04; B25J 17/0258; B25J 9/02; B25J 9/102; B25J 17/00; B25J 17/0283
(Continued)

(56) References Cited

U.S. PATENT DOCUMENTS 4,068,536 A 1/1978 Sutotsukuhausu
4,704,065 A * 11/1987 Allared
(Continued)

FOREIGN PATENT DOCUMENTS

JP 5383265 A 7/1978
JP 57168892 A 10/1982
(Continued)

OTHER PUBLICATIONS

International Preliminary Report on Patentability and Written Opinion for corresponding PCT Application No. PCT/JP2017/024629, 10 pages, dated Jan. 17, 2019.
(Continued)

*Primary Examiner* — Randell J Krug
(74) *Attorney, Agent, or Firm* — Matthew B. Dernier, Esq.

(57) ABSTRACT

A first transmission path includes a joint rotation member (13A) provided in a joint (J1) of an arm (Ar) and rotatable around a first axial line (Ax1), and a connection shaft portion (14A) that transmits rotation of an electric motor (11A) to the joint rotation member (13A). A second transmission path includes a joint gear (13B) provided in the joint (J1) of the arm (Ar) and rotatable around the first axial line (Ax1), and a connection shaft portion (14B) that transmits rotation of another electric motor (11B) to the joint gear (13B). Both of the connection shaft portion (14A) and the connection shaft portion (14B) are rotatable around the first axial line (Ax1), and the connection shaft portion (14B) is disposed on the
(Continued)

inner side of the connection shaft portion (14A). The joint gear (13B) is kept in engagement with a joint gear (15B) rotatable around a second axial line (Ax2) intersecting with the first axial line (Ax1). According to this structure, two movements of the arm (Ar) are permitted, and besides the exercise performance of the arm (Ar) can be improved.

12 Claims, 10 Drawing Sheets

(51) Int. Cl.
*B25J 9/02* (2006.01)
*B25J 9/10* (2006.01)
*B25J 17/02* (2006.01)

(58) Field of Classification Search
USPC .......................................................... 901/26
See application file for complete search history.

(56) References Cited

U.S. PATENT DOCUMENTS

| | | | |
|---|---|---|---|
| 4,761,114 A * | 8/1988 | Barland | B25J 17/0283 414/735 |
| 4,787,270 A | 11/1988 | Suica | |
| 4,984,959 A * | 1/1991 | Kato | |
| 4,990,050 A | 2/1991 | Tsuge | |
| 5,305,653 A | 4/1994 | Ohtani | |
| 7,673,536 B2 | 3/2010 | Tamura | |
| 2008/0056858 A1 | 3/2008 | Tamura | |

FOREIGN PATENT DOCUMENTS

| | | | |
|---|---|---|---|
| JP | 60044290 A | 3/1985 |
| JP | 6133884 A | 2/1986 |
| JP | 61159190 A | 7/1986 |
| JP | 61168485 A | 7/1986 |
| JP | 62088587 A | 4/1987 |
| JP | 63245384 A | 10/1988 |
| JP | 05261689 A | 10/1993 |
| JP | 2000237985 A | 9/2000 |
| JP | 2008055550 A | 3/2008 |

OTHER PUBLICATIONS

International Search Report for corresponding PCT Application No. PCT/JP2017/024629, 4 pages, dated Sep. 12, 2017.

Notification of Reasons for Refusal for corresponding JP Application No. 2018-526417, 16 pages, dated Mar. 10, 2020.

* cited by examiner

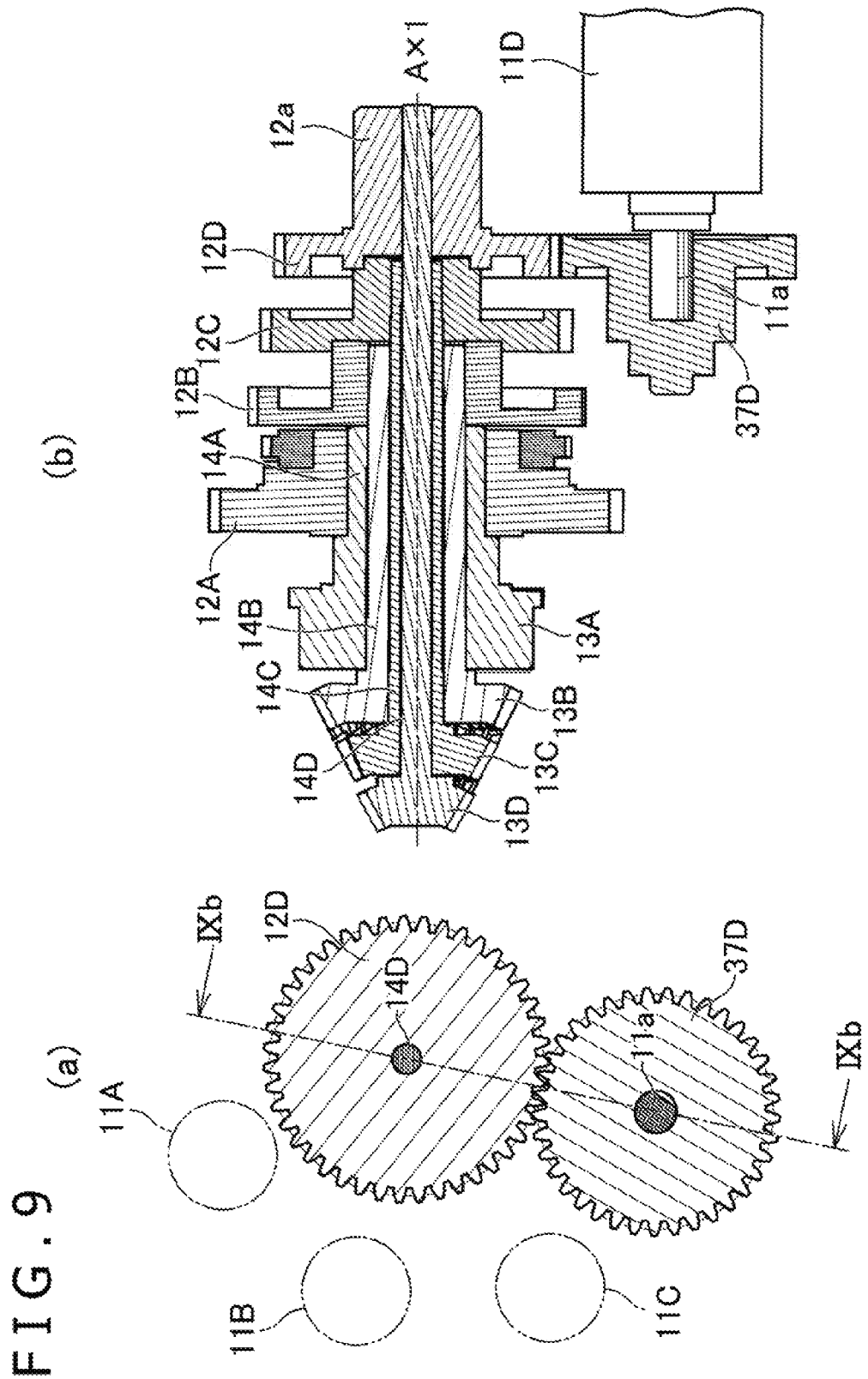

ARM DRIVING APPARATUS

TECHNICAL FIELD

The present invention relates to an arm driving apparatus that is utilized for driving of an arm provided on a robot.

BACKGROUND ART

As exemplified in Japanese Laid-Open Patent Application No. 2000-237985A, an electric motor for moving an arm is utilized in many robots. A joint of an arm is sometimes configured such that the arm can be moved in a plurality of directions. For example, in a robot that imitates a person or an animal, an arm can be moved in the forward and backward directions with respect to the body or can be moved in the leftward and rightward directions with respect to the body. In order to allow movements of an arm in two directions, two axes are provided at a joint such that the arm can be pivoted around each axis. In order to implement movements of an arm in two directions in this manner, two electric motors are required.

SUMMARY

If an electric motor is provided on an arm itself, then the weight of the arm is increased and high force (torque) is required to move the arm. Accordingly, even in the case where two electric motors are required in order to drive an arm, if the two electric motors can be disposed collectively on the body or the like of a robot, then the weight of the arm itself can be reduced and the exercise performance of the arm can be enhanced.

One embodiment of the arm driving apparatus proposed by the present disclosure includes a driving source unit including a first electric motor and a second electric motor, an arm including a first joint connected to the driving source unit, a first transmission path provided in the arm and configured to transmit rotation of the first electric motor, and a second transmission path provided in the arm and configured to transmit rotation of the second electric motor. The first transmission path includes a first joint rotation member provided in the first joint of the arm and rotatable around a first axial line and a first connection unit rotatable around the first axial line, connected to the first joint rotation member and configured to transmit rotation of the first electric motor to the first joint rotation member. The second transmission path includes a second joint rotation member provided in the first joint of the arm and rotatable around the first axial line and a second connection unit rotatable around the first axial line, connected to the second joint rotation member and configured to transmit rotation of the second electric motor to the second joint rotation member. One of the first connection unit and the second connection unit is disposed on an inner side of the other of the first connection unit and the second connection unit. At least one joint rotation member from between the first joint rotation member and the second joint rotation member is kept in engagement with a rotation member that is rotatable around a second axial line that intersects with the first axial line.

According to this arm driving apparatus, at least two movements of the arm can be implemented, and the two electric motors can be positioned closer to each other to improve the exercise performance of the arm.

BRIEF DESCRIPTION OF DRAWINGS

FIG. 9 is a view depicting a positional relationship between a driving gear and an electric motor of a transmission path D. (a) is a cross sectional view of a gear taken along line IXa-IXa of FIG. 2. (b) is a cross sectional view of the arm driving apparatus taken along line IXb-IXb of (a) of FIG. 9.

DESCRIPTION OF EMBODIMENT

Figure 1A:
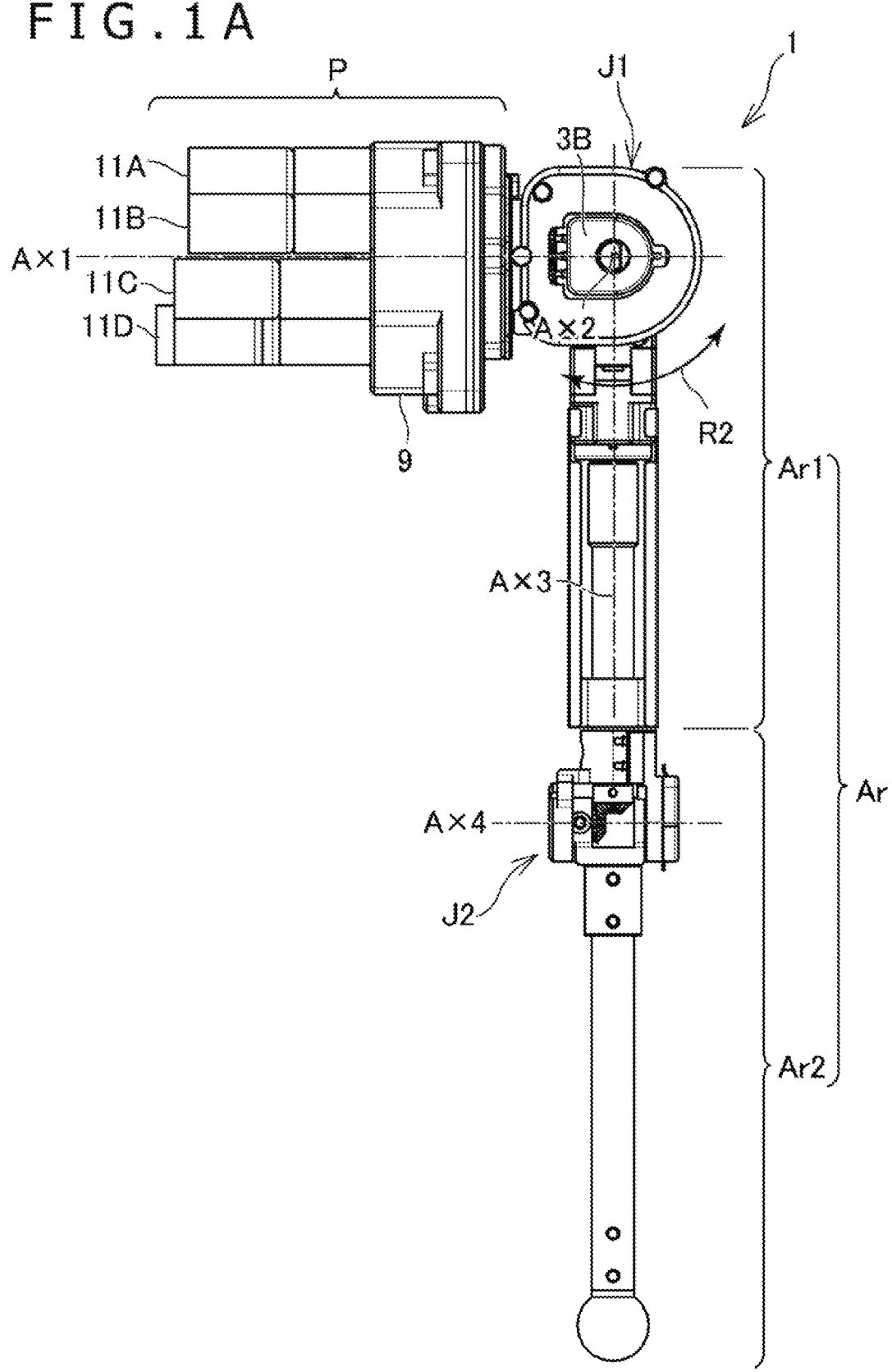
FIG. 1A is a front elevational view depicting an example of an arm driving apparatus proposed by the present disclosure.
Figure 1B:
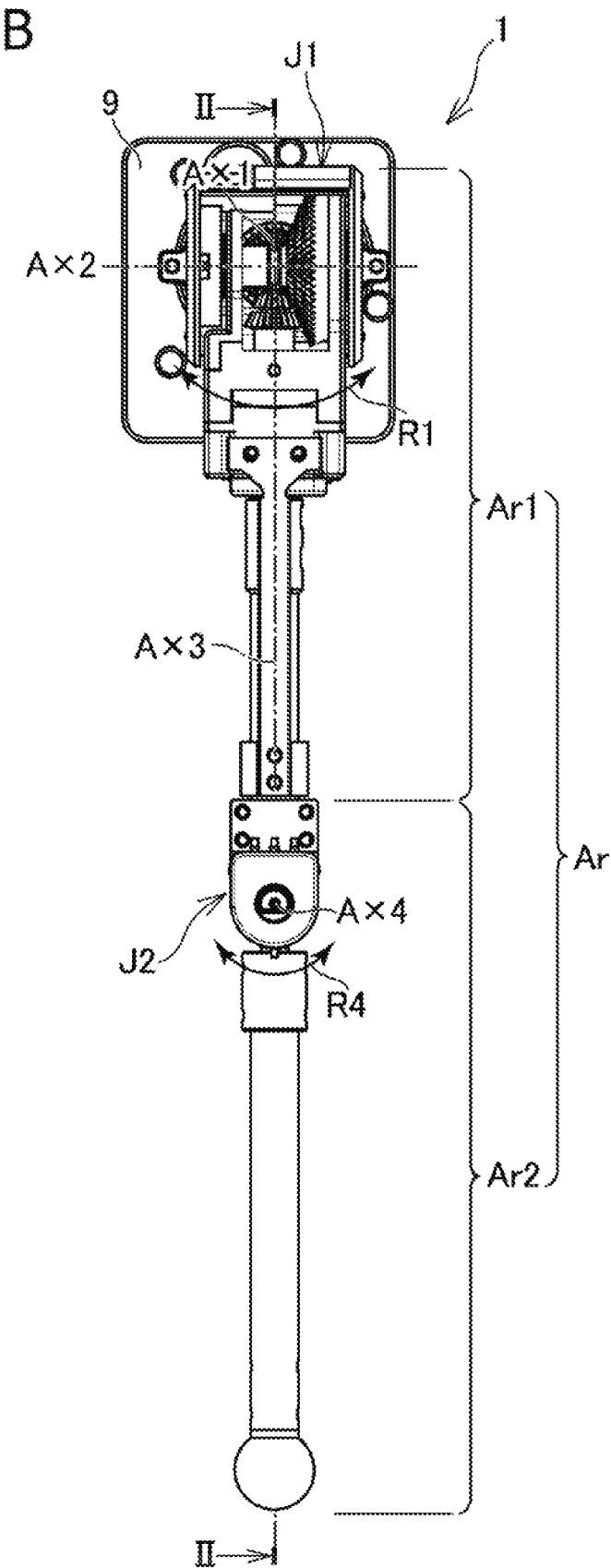
FIG. 1B is a side elevational view of the arm driving apparatus depicted in FIG. 1.
Figure 2:
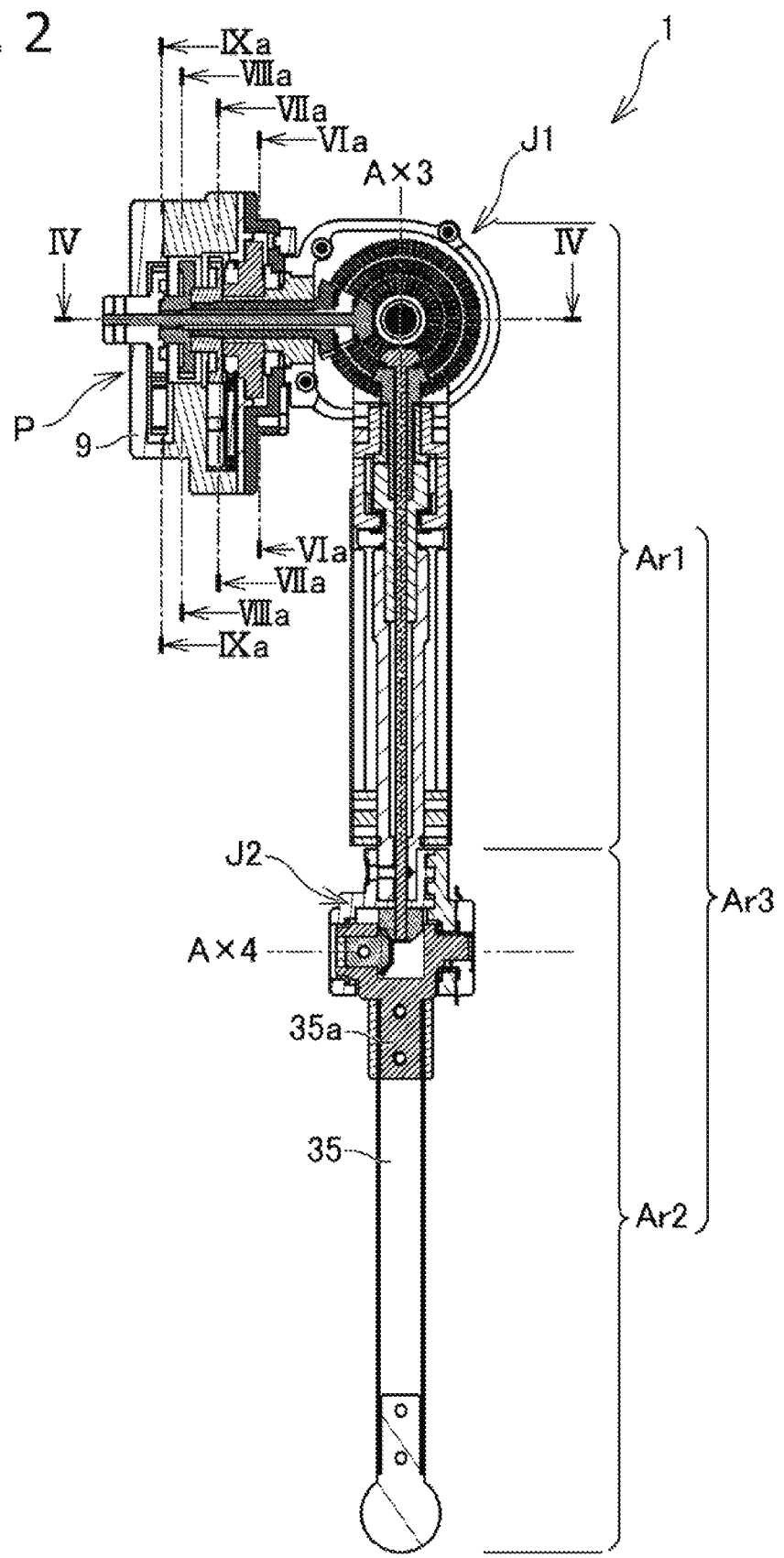
FIG. 2 is a cross sectional view of the arm driving apparatus taken along line II-II of FIG. 1B.
Figure 3:
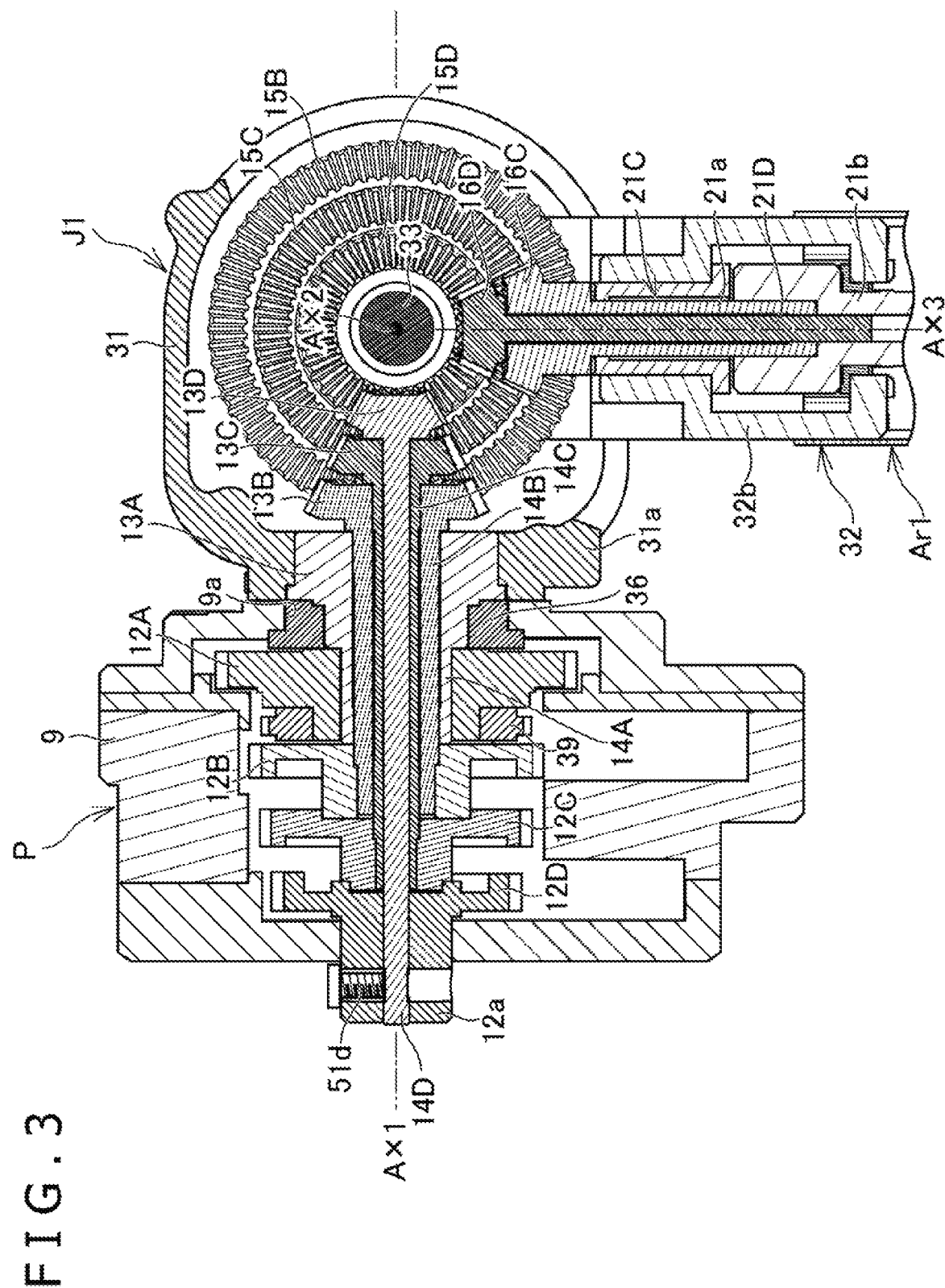
FIG. 3 is an enlarged view of FIG. 2. In this figure, a joint of an arm and a driving source unit are depicted.
Figure 4:
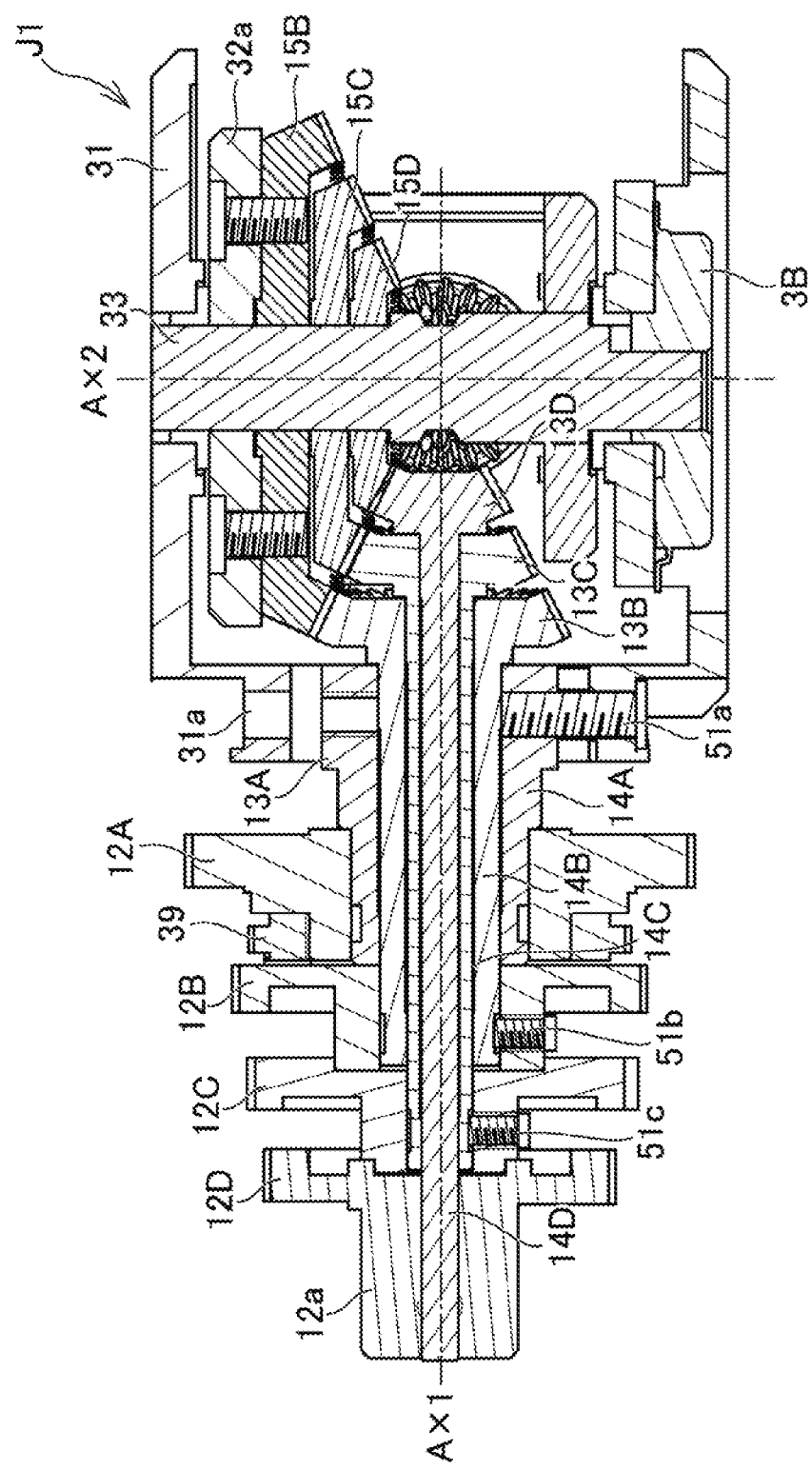
FIG. 4 is a cross sectional view of the arm driving apparatus taken along line IV-IV of FIG. 2.
Figure 5:
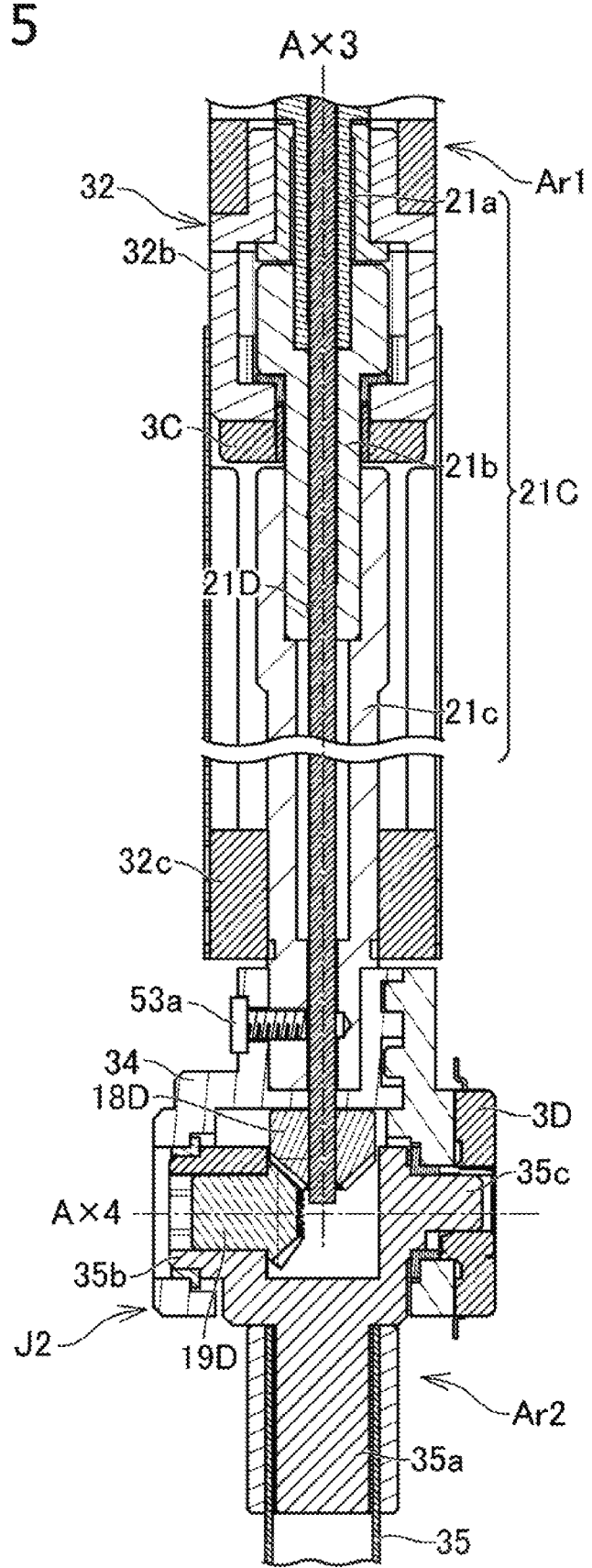
FIG. 5 is an enlarged view of FIG. 2 and depicts a joint between a first arm unit and a second arm unit.

In the following, an embodiment of an arm driving apparatus proposed by the present disclosure is described. FIG. 1A is a front elevational view of an example of the arm driving apparatus, and FIG. 1B is a side elevational view of the arm driving apparatus 1 depicted in FIG. 1A. FIG. 2 is a cross sectional view of the arm driving apparatus 1 taken along line II-II of FIG. 1B. FIG. 3 is an enlarged view of FIG. 2, and in this figure, a joint J1 of an arm Ar and a driving source unit P are depicted. FIG. 4 is a cross sectional view of the arm driving apparatus 1 taken along line IV-IV of FIG. 2. In FIG. 4, a case 9 of the driving source unit P is omitted. FIG. 5 is an enlarged view of FIG. 2, and in this figure, a joint J2 between a first arm unit Ar1 and a second arm unit Ar2 is depicted.

The arm driving apparatus 1 includes an arm Ar and a driving source unit P as depicted in FIGS. 1A and 1B. The driving source unit P includes a plurality of electric motors 11A, 11B, 11C and 11D that are driving sources for the arm Ar. Although the electric motors 11A, 11B, 11C and 11D are, for example, geared motors having a plurality of reduction gears built therein, they are not restricted to them. A joint J1 is provided at a proximal portion of the arm Ar. The driving source unit P is connected to the joint J1. In the example of the arm driving apparatus 1, the arm Ar includes a first arm unit Ar1 and a second arm unit Ar2. The joint J1 is provided at a proximal portion of the first arm unit Ar1. The second arm unit Ar2 is connected to the first arm unit Ar1 through the joint J2 and can move relative to the first arm unit Ar1. In the following description, the joint J1 is referred to as "first joint" and the joint J2 is referred to as "second joint." The arm driving apparatus 1 may not necessarily have the second arm unit Ar2.

In the example of the arm driving apparatus 1, the arm Ar is configured for four movements as hereinafter described in detail. In particular, the first arm unit Ar1 can move around a first axial line Ax1 depicted in FIGS. 1A and 1B (refer to an arrow mark R1 of FIG. 1B) and can move around a second axial line Ax2 depicted in FIGS. 1A and 1B (refer to an arrow mark R2 of FIG. 1A). The second arm unit Ar2 can pivot around a third axial line Ax3 depicted in FIG. 1B. Further, the second arm Ar2 can move around a fourth axial line Ax4 depicted in FIG. 1B (refer to an arrow mark R4). The driving source unit P includes four electric motors 11A, 11B, 11C and 11D as driving sources for the four movements described above. The arm driving apparatus 1 includes four transmission paths for transmitting rotation (power) of the four electric motors 11A, 11B, 11C and 11D to each component of the arm Ar to implement the movements described above. In the following description, the four transmission paths are referred to as transmission path A, transmission path B, transmission path C and transmission path D.

[Transmission Path A] The transmission path A transmits rotation of the electric motor 11A to the arm Ar to implement a movement of the arm Ar (refer to R1 of FIG. 1B) around the first axial line Ax1 described hereinabove. The transmission path A includes a driving gear 12A provided in the driving source unit P and rotatable around the first axial line Ax as depicted in FIG. 3. To the driving gear 12A, rotation (power) of the electric motor 11A is inputted.

Figure 6:
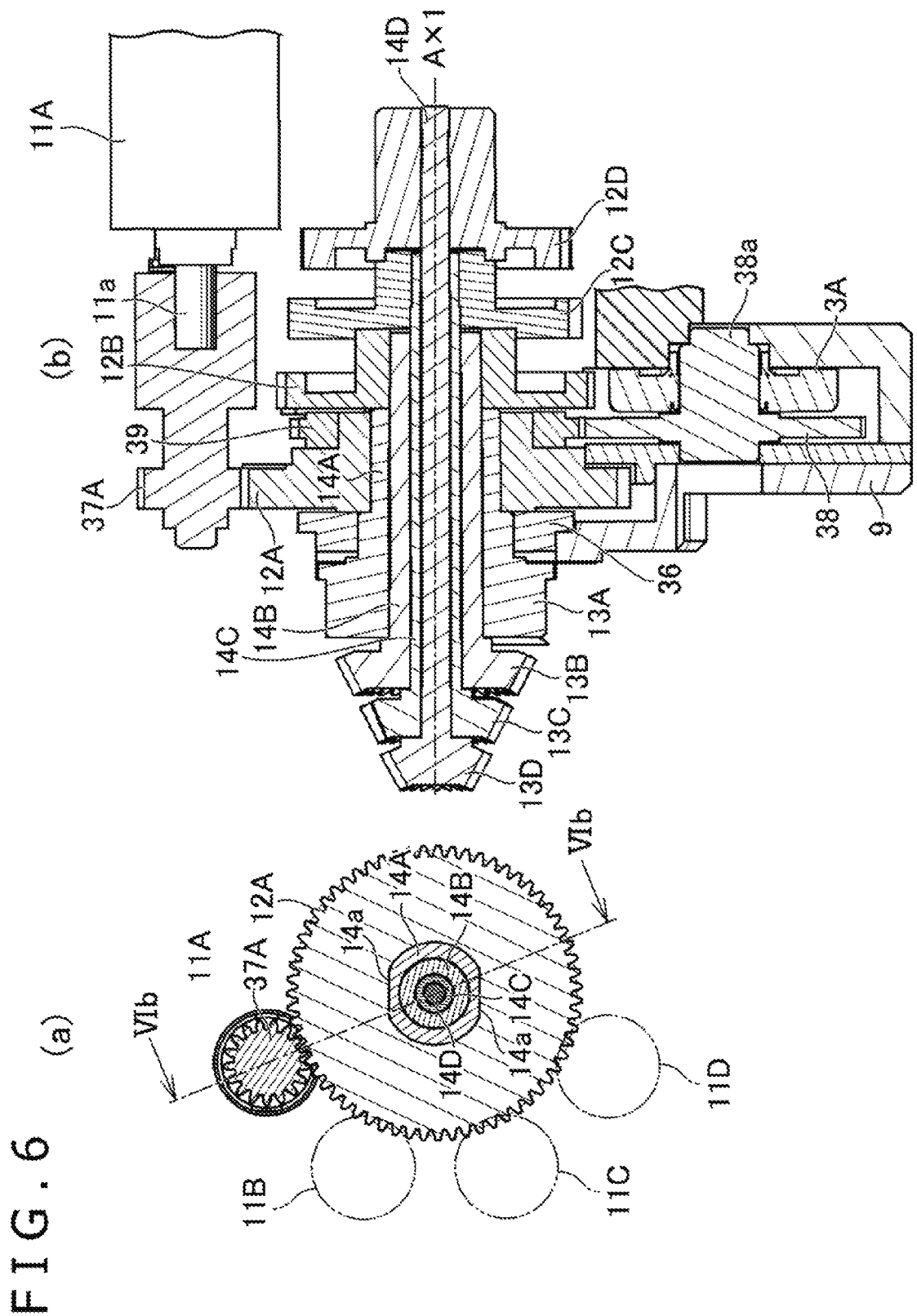
FIG. 6 is a view depicting a positional relationship between a driving gear and an electric motor of a transmission path A. (a) is a cross sectional view of a gear take along line VIa-VIa of FIG. 2. (b) is a cross sectional view of the arm driving apparatus taken along line VIb-VIb of (a) of FIG. 6.

FIG. 6 is a view depicting a positional relationship between the driving gear 12A and the electric motor 11A of the transmission path A. Referring to FIG. 6, (a) is a cross sectional view of the driving gear 12A and a gear 37A attached to the electric motor 11A taken along line VIa-VIa of FIG. 2. (b) is a cross sectional view of the arm driving apparatus 1 taken along line VIb-VIb of (a).

As depicted in (b) of FIG. 6, in the example of the arm driving apparatus 1, the electric motor 11A is disposed such that a rotary shaft 11a thereof is directed in the direction of the first axial line Ax. In other words, the rotary shaft 11a extends in parallel to the first axial line Ax1. The driving gear 12A is kept in engagement with the gear 37A attached to the rotary shaft 11a. Different from the example of the arm driving apparatus 1, a pulley may be provided in the driving source unit P in place of the driving gear 12A, and a pulley may be provided also on the rotary shaft 11a of the electric motor 11A in place of the gear 37A. Further, the two pulleys may be connected to each other by a belt.

As depicted in FIG. 3, the transmission path A includes a rotation member 13A provided in the first joint J1 and rotatable around the first axial line Ax1 (the rotation member 13A is hereinafter referred to as "joint rotation member"). The joint rotation member 13A is connected to the driving gear 12A such that it rotates integrally with the driving gear 12A around the first axial line Ax1. In particular, the transmission path A includes a connection shaft portion 14A rotatable around the first axial line Ax1. The joint rotation member 13A is connected to one end of the connection shaft portion 14A. The driving gear 12A is connected to the joint rotation member 13A through the connection shaft portion 14A. Rotation of the electric motor 11A is transmitted to the joint rotation member 13A through the connection shaft portion 14A.

In the example of the arm driving apparatus 1, the connection shaft portion 14A is formed integrally with the joint rotation member 13A. The driving gear 12A is fitted to the outer side of the connection shaft portion 14A and fixed to an end portion of the connection shaft portion 14A. As depicted in (a) of FIG. 6, flat faces 14a are formed at part of an outer circumferential face of the connection shaft portion 14A. By this, the joint rotation member 13A, connection shaft portion 14A and driving gear 12A rotate integrally around the first axial line Ax1.

The connection shaft portion 14A is formed cylindrically. On the inner side of the connection shaft portion 14A, connection shaft portions 14B, 14C and 14D of the transmission paths B, C and D hereinafter described are disposed. The structure for connecting the driving gear 12A and the joint rotation member 13A is not limited to the example of the arm driving apparatus 1. For example, the connection shaft portion 14A may be formed as a separate member from the joint rotation member 13A. Further, the connection shaft portion 14A and the driving gear 12A may be formed integrally. As depicted in FIG. 3, the driving source unit P includes a case 9 that holds the driving gear 12A, and driving gears 12B, 12C and 12D hereinafter described and so forth thereon. The connection shaft portion 14A is fitted in an opening 9a formed in the case 9. The connection shaft portion 14A is held for rotation on the inner side of the opening 9a. In particular, a bearing 36 is disposed on the inner side of the opening 9a, and the connection shaft portion 14A is supported for rotation by the bearing 36.

In the example of the arm driving apparatus 1, the first joint J1 includes a joint holder 31 that supports thereon a rotation member (more particularly, a support shaft 33 hereinafter described) that configures the first joint J1. The joint holder 31 is attached to the joint rotation member 13A and is rotatable around the first axial line Ax together with the joint rotation member 13A. Accordingly, if the electric motor 11A is driven, then the driving gear 12A, connection shaft portion 14A, joint rotation member 13A, indirect holder 31 and support shaft 33 rotate integrally to implement a movement of the arm Ar around the first axial line Ax1, namely, a movement in a direction of the arrow mark R1 depicted in FIG. 1B.

In the example of the arm driving apparatus 1, the joint rotation member 13A is positioned closer to the driving source unit P than joint gears 13B, 13C and 13D hereinafter described and is attached to the joint holder 31. In particular, as depicted in FIG. 4, the joint holder 31 has a wall portion 31a positioned closer to the driving source unit P and has an opening in the wall portion 31a. The joint rotation member 13A is fitted in the inside of the opening and is fixed to the wall portion 31a by a fixture 51a such as a screw. The attachment structure of the joint rotation member 13A and the joint holder 31 is not limited to the example of the arm driving apparatus 1. For example, the joint rotation member 13A and the joint holder 31 may be formed integrally.

The arm driving apparatus 1 includes an encoder 3A for detecting an angle of the first arm unit Ar1 in a circumferential direction around the first axial line Ax1. In the example of the arm driving apparatus 1, a gear 39 that rotates integrally with the driving gear 12A around the first axial line Ax1 is attached to the driving gear 12A as depicted in (b) of FIG. 6. Further, the driving source unit P includes a gear 38 having a shaft portion 38a disposed in parallel to the first axial line Ax1 and rotatable around the shaft portion 38a. The gear 38 is kept in engagement with the gear 39. The encoder 3A is attached to the shaft portion 38a. A control apparatus (not depicted) for controlling the arm driving apparatus 1 calculates the angle of the first arm unit Ar1 on the basis of an output signal of the encoder 3A. The position of the encoder 3A is not limited to the example of the arm driving apparatus 1. For example, the encoder 3A may be attached to the connection shaft portion 14A.

[Transmission Path B] The transmission path B transmits rotation of the electric motor 11B to the arm Ar to implement of a movement of the arm Ar (refer to R2 of FIG. 1A) around the second axial line Ax2 described hereinabove. The transmission path B includes a driving gear 12B provided in the driving source unit P and rotatable around the first axial line Ax as depicted in FIG. 3. To the driving gear 12B, rotation (power) of the electric motor 11B is inputted.

Figure 7:
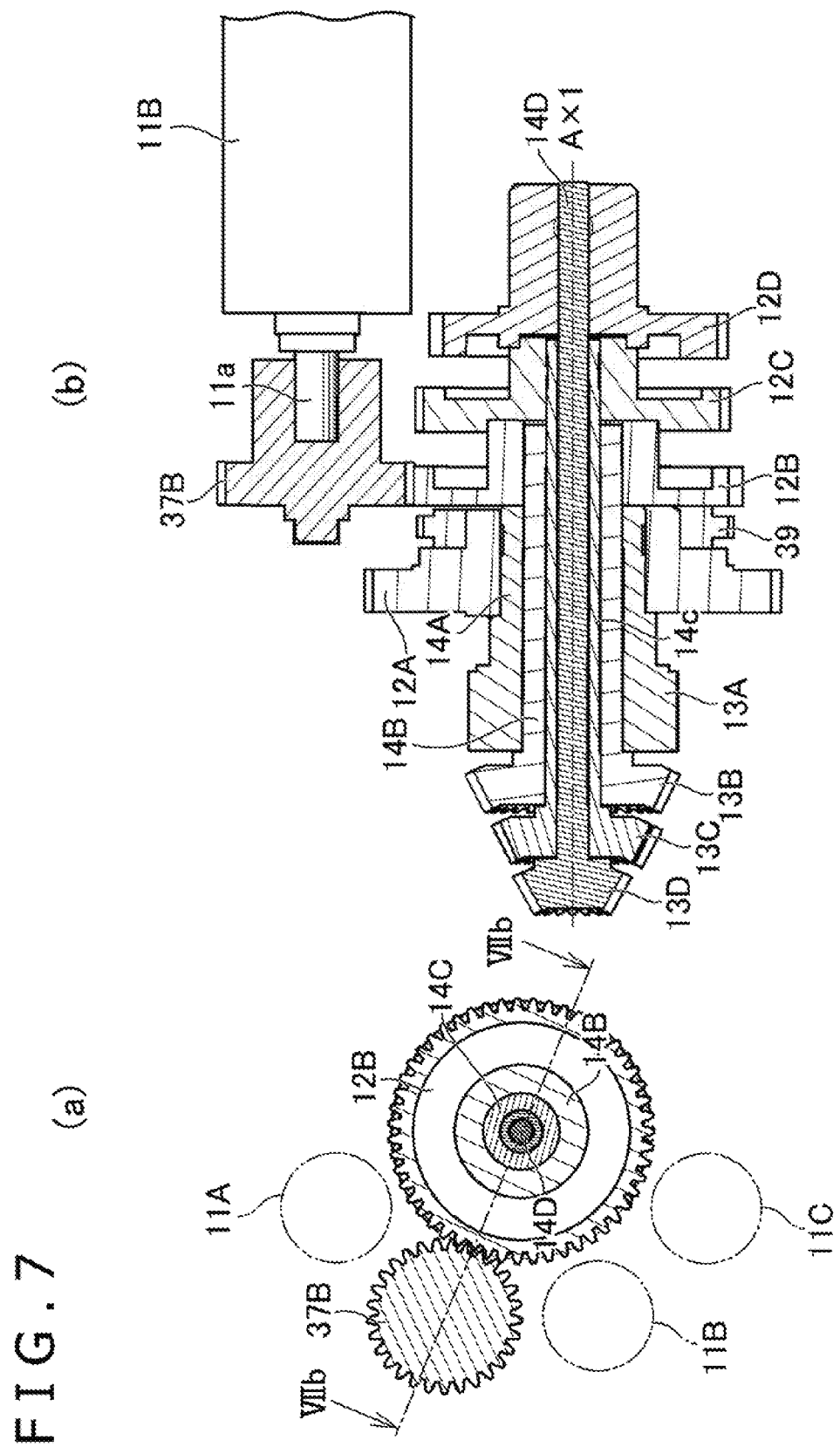
FIG. 7 is a view depicting a positional relationship between a driving gear and an electric motor of a transmission path B. (a) is a cross sectional view of a gear taken along line VIIa-VIIa of FIG. 2. (b) is a cross sectional view of the arm driving apparatus taken along line VIIb-VIIb of (a).

FIG. 7 is a view depicting a positional relationship between the driving gear 12B and the electric motor 11B of the transmission path B. Referring to FIG. 7, (a) is a cross sectional view of the driving gear 12B and a gear 37B attached to the electric motor 11B of the transmission path B taken along line VIIa-VIIa of FIG. 2, and (b) is a cross sectional view of the arm driving apparatus 1 taken along line VIIb-VIIb of (a).

As depicted in (b) of FIG. 7, the electric motor 11B is disposed such that the rotary shaft 11a thereof is directed in the direction of the first axial line Ax1. The driving gear 12B is kept in engagement with the gear 37B attached to the rotary shaft 11a. Different from the example of the arm driving apparatus 1, a pulley may be provided in the driving source unit P in place of the driving gear 12B while a pulley is provided also on the rotary shaft 11a of the electric motor 11B in place of the gear 37B. Further, the two pulleys may be connected to each other by a belt.

As depicted in FIG. 3, the outer diameter of the driving gear 12A of the transmission path A described hereinabove is greater than the outer diameter of the driving gear 12B. This makes it possible to make the reduction ratio between the electric motor 11A and the driving gear 12A higher than the reduction ration between the electric motor 11B and the driving gear 12B. As a result, the power (torque) of the first movement of the arm Ar to be implemented by the transmission path A can be increased.

As described hereinabove, also the electric motor 11A of the transmission path A is disposed such that the rotary shaft 11a thereof is directed in the direction of the first axial line Ax. As depicted in (a) of FIG. 7, the electric motors 11A and 11B are lined up in a circumferential direction around the first axial line Ax1. In the example of the arm driving apparatus 1, also electric motors 11C and 11D are lined up in a circumferential direction around the first axial line Ax1 together with the electric motors 11A and 11B. This facilitates incorporation of the arm driving apparatus 1 into a robot or the like.

As depicted in FIG. 3, the transmission path B includes a joint gear 13B provided on the first joint J1 and rotatable round the first axial line Ax1. The joint gear 13B is connected to the driving gear 12B such that it rotates integrally with the driving gear 12B. In particular, the transmission path B includes a connection shaft portion 14B rotatable around the first axial line Ax1. The joint gear 13B is connected to one end of the connection shaft portion 14B. The driving gear 12B is connected to the joint gear 13B through the connection shaft portion 14B. Rotation of the electric motor 11B is transmitted to the joint gear 13B through the connection shaft portion 14B.

As depicted in FIG. 3, the joint rotation member 13A and the driving gear 12A of the transmission path A are disposed between the joint gear 13B and the driving gear 12B of the transmission path B in the direction of the first axial line Ax1. The connection shaft portion 14A of the transmission path A is formed cylindrically. The connection shaft portion 14B is disposed on the inner side of the connection shaft portion 14A. The opposite ends of the connection shaft portion 14B project from the connection shaft portion 14A. The joint gear 13B and the driving gear 12B are fixed to the opposite ends of the connection shaft portion 14B. The inner face of the connection shaft portion 14A and the outer face of the connection shaft portion 14B may contact directly with each other, or a bearing may be disposed between them. Further, in the case where the inner face of the connection shaft portion 14A and the outer face of the connection shaft portion 14B contact directly with each other, lubricating oil may be filled between them.

In the example of the arm driving apparatus 1, the connection shaft portion 14B is formed integrally with the joint gear 13B. The driving gear 12B is fitted to the outer side of an end portion of the connection shaft portion 14B. As depicted in FIG. 4, a central portion of the driving gear 12B is fixed to the connection shaft portion 14B by a fixture 51b such as a screw. By this, the joint gear 13B and the connection shaft portion 14B rotate integrally with the driving gear 12B around the first axial line Ax1. The structure for connecting the driving gear 12B and the joint gear 13B to each other is not limited to the example of the arm driving apparatus 1. For example, the connection shaft portion 14B may be a member formed separately from the joint gear 13B. Further, the connection shaft portion 14B may be formed integrally with the driving gear 12B.

As depicted in FIG. 4, the transmission path B includes a joint gear 15B provided in the first joint J1 and rotatable around the second axial line Ax2 that intersects with the first axial line Ax1. The second axial line Ax2 is directed to a direction intersecting with both of extension directions of the first axial line Ax1 and the first arm unit Ar1. More particularly, the second axial line Ax2 is defined to a direction orthogonal to both of the extension directions of the first axial line Ax1 and the first arm unit Ar1. The two joint gears 13B and 15B in the transmission path B are bevel gears and are kept in engagement with each other. This structure makes it possible to implement a movement different from the movement of the arm Ar around the first axial line Ax1 (movement by the transmission path A). In the example of the arm driving apparatus 1, a proximal portion of the first arm unit Ar1 is attached to the joint gear 15B. Accordingly, the first arm unit Ar1 and the joint gear 15B move integrally around the second axial line Ax2. If the electric motor 11B is driven, then the driving gear 12B, connection shaft portion 14B and joint gears 13B and 15B rotate integrally thereby to implement the movement of the arm Ar around the second axial line Ax2, namely, the movement in the direction of the arrow mark R2 depicted in FIG. 1A. The joint gear 13B and the joint gear 15B may configure a reduction mechanism. For example, the number of teeth of the joint gear 15B may be greater than the number of teeth of the joint gear 13B. This makes it possible to increase the torque of the first arm unit Ar1 around the second axial line Ax2. Different from the example of the arm driving apparatus 1, the number of teeth of the joint gear 15B may be equal to the number of teeth of the joint gear 13B.

As depicted in FIG. 4, the first arm unit Ar1 has a connection portion 32a at a proximal portion thereof. The connection portion 32a is fixed to the joint gear 15B by a fixture such as a screw. The connection portion 32a is positioned on the outer side of the joint gear 15B and joint gears 15C and 15D hereinafter described in the direction of the second axial line Ax2. The fixation structure between the proximal portion of the first arm unit Ar1 and the joint gear 15B is not limited to the example of the arm driving apparatus 1 that utilizes a fixture such as a screw.

As depicted in FIG. 4, the first joint J1 includes the support shaft 33 rotatable around the second axial line Ax. The joint holder 31 holds an end portion of the support shaft 33 such that the support shaft 33 can rotate around the second axial line Ax. The joint gear 15B and the connection portion 32a are provided on the support shaft 33 such that they rotate integrally with the support shaft 33. It is to be noted that, when the electric motor 11A of the transmission path A is driven, the support shaft 33 rotates around the first axial line Ax1 together with the joint holder 31 that holds the support shaft 33 thereon.

The joint gears 13B and 15B may not necessarily be bevel gears if they are structured such that rotation of the driving gear 12B around the first axial line Ax1 can be converted into rotation around the second axial line Ax2. For example, the joint gears 13B and 15B may be face gears or worm gears.

The arm driving apparatus 1 includes an encoder 3B for detecting an angle of the first arm unit Ar1 in a circumferential direction around the second axial line Ax2. As depicted in FIG. 4, in the example of the arm driving apparatus 1, the encoder 3B is attached to an end portion of the support shaft 33 and outputs a signal according to the rotational position of the support shaft 33. A control apparatus (not detected) for controlling the arm driving apparatus 1 calculates the angle of the first arm unit Ar1 around the second axial line Ax2 on the basis of the output signal of the encoder 3B. The position of the encoder 3B is not limited to the example of the arm driving apparatus 1.

[Transmission Path C] The transmission path C transmits rotation of the electric motor 11C to the arm Ar to implement a movement of the second arm unit Ar2 around the third axial line Ax3 described hereinabove (refer to FIGS. 1A and 1B). The transmission path C includes a driving gear 12C provided in the driving source unit P and rotatable around the first axial line Ax. To the driving gear 12C, rotation (power) of the electric motor 11C is inputted.

Figure 8:
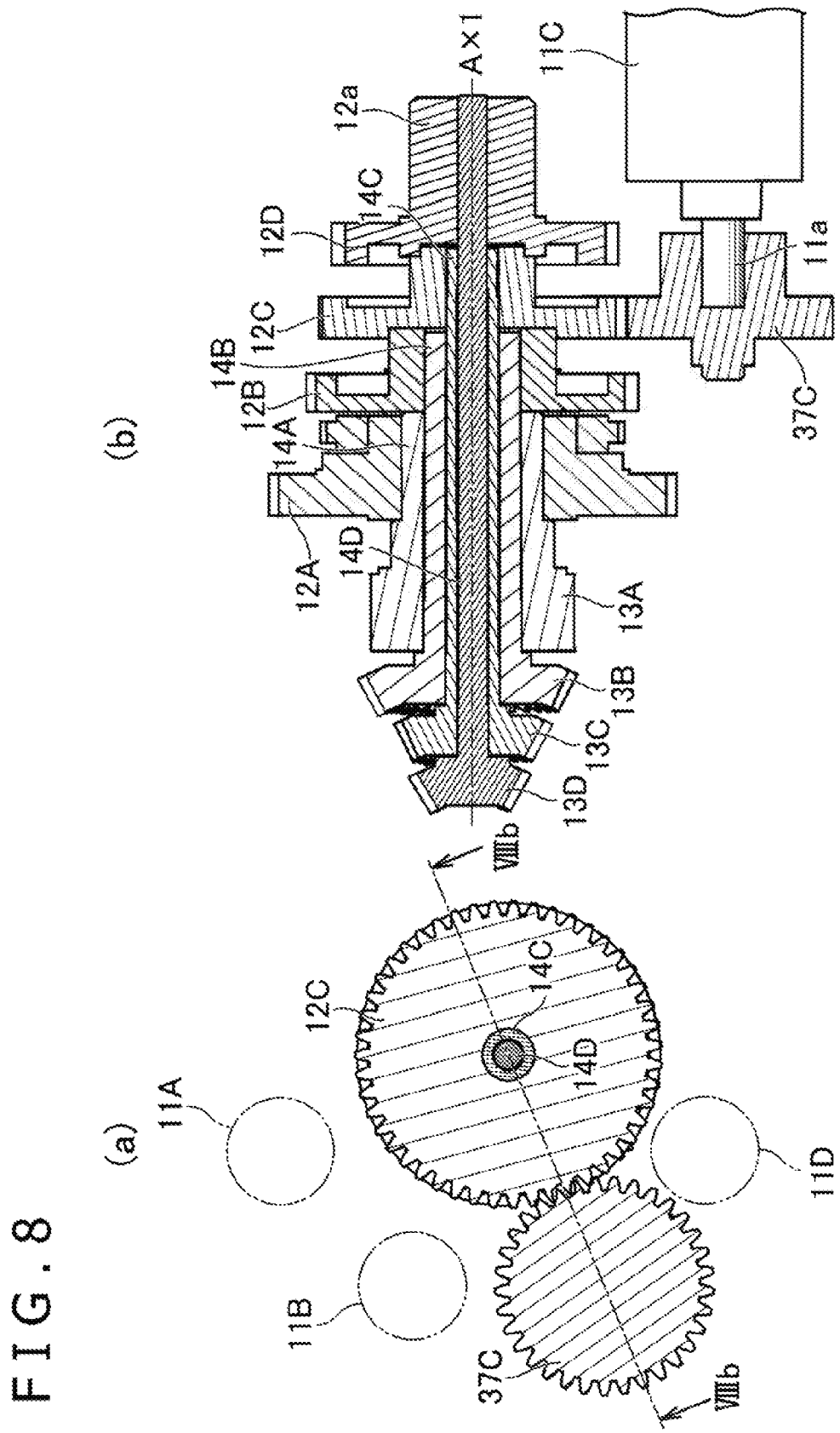
FIG. 8 is a view depicting a positional relationship between a driving gear and an electric motor of a transmission path C. (a) is a cross sectional view of a gear taken along line VIIIa-VIIIa of FIG. 2. (b) is a cross sectional view of the arm driving apparatus taken along line VIIIb-VIIIb of (a).

FIG. 8 is a view depicting a positional relationship between the driving gear 12C and the electric motor 11C of the transmission path C. Referring to FIG. 8, (a) is a cross sectional view of the driving gear 12C and a gear 37C attached to the electric motor 11C of the transmission path C taken along line VIIa-VIIa of FIG. 2, and (b) is a cross sectional view of the arm driving apparatus 1 taken along line VIIb-VIIb of (a).

As depicted in FIG. 8, the driving gear 12C is kept in engagement with the gear 37C attached to the rotary shaft 11a of the electric motor 11C. It is to be noted that a pulley may be provided in the driving source unit P in place of the driving gear 12C while another pulley is provided on the rotary shaft 11a of the electric motor 11C in place of the gear 37C. Further, the two pulleys may be connected to each other by a belt.

As depicted in (b) of FIG. 8, the electric motor 11C is disposed such that the rotary shaft 11a thereof is directed in a direction of the first axial line Ax. As described hereinabove, also the electric motor 11A of the transmission path A and the electric motor 11B of the transmission path B are disposed such that the rotary shafts 11a are directed in the direction of the first axial line Ax1. The electric motors 11A, 11B and 11C are lined up in a circumferential direction around the first axial line Ax1 (refer to (a) of FIG. 8).

As depicted in FIG. 3, the transmission path C includes joint gears 13C, 15C and 16C provided on the first joint J1. The joint gear 13C is rotatable around the first axial line Ax1 and is connected to the driving gear 12C such that it rotates integrally with the driving gear 12C. In particular, the transmission path C incudes a connection shaft portion 14C rotatable around the first axial line Ax1. The joint gear 13C is connected to one end of the connection shaft portion 14C. The driving gear 12C is connected to the joint gear 13C through the connection shaft portion 14C such that rotation of the electric motor 11C is transmitted to the joint gear 13C through the connection shaft portion 14C. The joint gear 13C is lined up with the joint rotation member 13A and the joint gear 13B in the direction of the first axial line Ax1. The joint gear 13C has a diameter smaller than that of the joint gear 13B.

The joint rotation member 13A, joint gear 13B and driving gears 12A and 12B of the transmission paths A and B described hereinabove are disposed between the joint gear 13C and the driving gear 12C in the direction of the first axial line Ax1. The connection shaft portions 14A and 14B described above are formed cylindrically. The connection shaft portion 14C is disposed on the inner side of the connection shaft portions 14A and 14B. The opposite ends of the connection shaft portion 14C project from the connection shaft portions 14A and 14B, and the joint gear 13C and the driving gear 12C are fixed to the opposite ends of the connection shaft portion 14C. The inner face of the connection shaft portion 14B and the outer face of the connection shaft portion 14C may contact directly with each other, or a bearing may be disposed between them. Further, in the case where the inner face of the connection shaft portion 14B and the outer face of the connection shaft portion 14C contact directly with each other, lubricating oil may be filled between them.

In the example of the arm driving apparatus 1, the connection shaft portion 14C is formed integrally with the joint gear 13C. The driving gear 12C is fitted to the outer side of the connection shaft portion 14C. As depicted in FIG. 4, a central portion of the driving gear 12C is fixed to the connection shaft portion 14B by a fixture 51c such as a screw. By this, the joint gear 13C rotates integrally with the driving gear 12C around the first axial line Ax1. The structure for connecting the driving gear 12C and the joint gear 13C to each other is not limited to the example of the arm driving apparatus 1. For example, the connection shaft portion 14C may be a member formed separately from the joint gear 13C. Alternatively, the connection shaft portion 14C may be formed integrally with the driving gear 12C.

As depicted in FIG. 4, the joint gear 15C is rotatable around the second axial line Ax2. The joint gear 15C is provided on the support shaft 33 described hereinabove and is lined up with the joint gear 15B of the transmission path B in the direction of the second axial line Ax2. The joint gear 15C has a diameter smaller than that of the joint gear 15B and is positioned closer to the center of the support shaft 33 with respect to the joint gear 15B. Different from the joint gear 15B of the transmission path B, the joint gear 15C is rotatable relative to the support shaft 33. The joint gears 13C and 15C are bevel gears and are kept in engagement with each other similarly to the joint gears 13B and 15B described hereinabove. The positional relationship between the joint gear 15C and the joint gear 15B is not limited to the example of the arm driving apparatus 1. For example, the joint gear 15C and the joint gear 15B may be positioned on the opposite sides across the center of the support shaft 33 (intersecting point between the first axial line Ax1 and the second axial line Ax2). The joint gear 13C and the joint gear 15C may construct a reduction mechanism. For example, the number of teeth of the joint gear 15C may be greater than the number of teeth of the joint gear 13C. This makes it possible to increase the torque of the second arm unit Ar2 around the third axial line Ax3. Different from the example of the arm driving apparatus 1, the number of teeth of the joint gear 15C may be equal to the number of teeth of the joint gear 13C.

As depicted in FIG. 3, the joint gear 16C is rotatable around the third axial line Ax3. As described hereinabove, the third axial line Ax3 is an axial line that intersects with both of the first axial line Ax1 and the second axial line Ax2. In the example of the arm driving apparatus 1, the third axial line Ax3 is defined in the extension direction of the first arm unit Ar1, and the third axial line Ax3 intersects orthogonally with the second axial line Ax2. The joint gear 16C is a bevel gear and is kept in engagement with the joint gear 15C. In the example of the arm driving apparatus 1, the number of teeth of the joint gear 16C is smaller than the number of teeth of the joint gear 15C. Different from the example of the arm driving apparatus 1, the number of teeth of the joint gear 16C may be equal to the number of teeth of joint gear 15C or may be greater than the number of teeth of the joint gear 15C. In the example of the arm driving apparatus 1, the second arm unit Ar2 is connected to the joint gear 16C such that the second arm unit Ar2 and the joint gear 16C rotate integrally around the third axial line Ax3.

In particular, as depicted in FIGS. 3 and 5, the first arm unit Ar1 has a connection shaft portion 21C that is rotatable around the third axial line Ax3. The joint gear 16C is connected to the second arm unit Ar2 through the connection shaft portion 21C. In particular, the joint gear 16C is fixed to one end portion of the connection shaft portion 21C, and the second arm unit Ar2 is connected to the other end portion of the connection shaft portion 21C. Consequently, if the electric motor 11C is driven, then the driving gear 12C, connection shaft portion 14C, joint gears 13C, 15C and 16C and connection shaft portion 21C rotate integrally to implement a movement of the second arm unit Ar2 around the third axial line Ax3.

In the example of the arm driving apparatus 1, as depicted in FIG. 3, the connection shaft portion 21C has a first shaft portion 21a formed integrally with the joint gear 16C described hereinabove. Further, as depicted in FIG. 5, the connection shaft portion 21C has a second shaft portion 21b connected to the first shaft portion 21a in the direction of the third axial line Ax3 and a third shaft portion 21c connected to the second shaft portion 21b in the direction of the third axial line Ax3. The three shaft portions 21a, 21b and 21c rotate integrally. At a proximal portion of the second arm unit Ar2, a joint holder 34 that holds joint gears 18D and 19D that configure the second joint J2 is provided. The third shaft portion 21c of the connection shaft portion 21C is fixed to the joint holder 34 by a fixture $53_a$ such as a screw.

It is to be noted that the joint gears 13C, 15C and 16C that configure the transmission path C may not necessarily be bevel gears if they can convert rotation around the first axial line Ax1 of the driving gear 12C into rotation around the third axial line Ax3. For example, the joint gears 13C, 15C and 16C may be face gears. Further, the second joint J2 may include an elastic member (for example, a spring) for assisting a movement of the second arm unit Ar2 around the third axial line Ax3.

As depicted in FIG. 3, the first arm unit Ar1 includes a shaft portion holder 32. The shaft portion holder 32 has, at an upper end thereof, the connection portion 32a (refer to FIG. 4) fixed to the joint gear 15B that configures the first joint J1. The shaft portion holder 32 extends downwardly from the connection portion 32a. The connection shaft portion 21C is held for rotation by the shaft portion holder 32. In the example of the arm driving apparatus 1, the shaft portion holder 32 has, at an upper portion thereof, a first portion 32b formed cylindrically. On the inner side of the first portion 32b, proximal portions of the first shaft portion 21a and the second shaft portion 21b of the connection shaft portion 21C are disposed. The first shaft portion 21a and the second shaft portion 21b are held for rotation by the first portion 32b. As depicted in FIG. 5, the shaft portion holder 32 further has, at a lower portion thereof, a second portion 32c formed cylindrically. A third shaft portion 21c is disposed on the inner side of the second portion 32c. The third shaft portion 21c is held for rotation by the second portion 32c. The shape of the shaft portion holder 32 is not limited to the example of the arm driving apparatus 1 and may be changed suitably.

The first arm unit Ar1 includes an encoder 3C for detecting the angle (rotational position) of the second arm unit Ar2 in a circumferential direction around the third axial line Ax3. In the example of the arm driving apparatus 1, the encoder 3C is fitted to the outer side of the second shaft portion 21b of the connection shaft portion 21C and is attached to the first portion 21b of the shaft portion holder 32 as depicted in FIG. 5.

[Transmission Path D] The transmission path D transmits rotation of the electric motor 11D to the arm Ar to implement of a movement of the second arm unit Ar2 (refer to an arrow mark R4 of FIG. 1B) around the fourth axial line Ax4 described hereinabove (refer to FIG. 5). As depicted in FIG. 3, the transmission path D includes a driving gear 12D provided in the driving source unit P and rotatable around the first axial line Ax. To the driving gear 12D, rotation (power) of the electric motor 11D is inputted.

FIG. 9 is a view depicting a positional relationship between the driving gear 12D and the electric motor 11D of the transmission path D. Referring to FIG. 9, (a) is a cross sectional view of the driving gear 12D of the transmission path D and a gear 37D attached to the rotary shaft 11a of the electric motor 11D taken along line IXa-IXa of FIG. 2. (b) is a cross sectional view of the arm driving apparatus 1 taken along line IXb-IXb of (a). As depicted in FIG. 9, the driving gear 12D is kept in engagement with the gear 37D attached to the rotary shaft 11a of the electric motor 11D. It is to be noted that a pulley may be provided in the driving source unit P in place of the driving gear 12D while another pulley is provided on the rotary shaft 11a of the electric motor 11D in place of the gear 37D. Further, the two pulleys may be connected to each other by a belt.

As depicted in (b) of FIG. 9, the electric motor 11D is disposed such that the rotary shaft 11a thereof is directed in a direction of the first axial line Ax. As described hereinabove, also the electric motors 11A, 11B and 11C are disposed such that the rotary shafts 11a thereof are directed in a direction of the first axial line Ax1. The electric motors 11A, 11B, 11C and 11D are lined up in a circumferential direction around the first axial line Ax1.

The transmission path D includes joint gears 13D, 15D and 16D provided in the first joint J1 as depicted in FIG. 3. The joint gear 13D is rotatable around the first axial line Ax1. The joint gear 13D is lined up with the joint rotation member 13A and the joint gears 13B and 13C in a direction of the first axial line Ax1. The joint gear 13D has a diameter smaller than that of the joint gear 13C.

The joint gear 13D is connected to the driving gear 12D such that it rotates integrally with the driving gear 12D. More particularly, as depicted in FIG. 3, the transmission path D includes a connection shaft portion 14D rotatable around the first axial line Ax1. The joint gear 13D is connected to one end of the connection shaft portion 14D. The driving gear 12D is connected to the joint gear 13D through the connection shaft portion 14D such that rotation of the electric motor 11D is transmitted to the joint gear 13D through the connection shaft portion 14D.

As depicted in FIG. 3, in the example of the arm driving apparatus 1, the connection shaft portion 14D and the joint gear 13D are formed integrally with each other. The driving gear 12D is fitted to the outer side of the connection shaft portion 14D. The driving gear 12D is fixed to the connection shaft portion 14D by a fixture 51d (refer to FIG. 3) such as a screw. By this, the joint gear 13D rotates integrally with the driving gear 12D around the first axial line Ax1. As depicted in FIG. 3, a rear portion 12a of the driving gear 12D is fitted in an opening formed in the case 9 of the driving source unit P and is held for rotation on the inner side of the opening.

As depicted in FIG. 3, the joint rotation member 13A, joint gears 13B and 13C and driving gears 12A, 12B and 12C described hereinabove are positioned between the joint gear 13D and the driving gear 12D in the direction of the first axial line Ax1. The connection shaft portions 14A, 14B and 14C are formed cylindrically, and the connection shaft portion 14D is disposed on the inner side of them. The joint gear 13D and the driving gear 12D are fixed to the opposite ends of the connection shaft portion 14D. The inner face of the connection shaft portion 14C and the outer face of the connection shaft portion 14D may contact directly with each other or a bearing may be disposed between them. In the case where the inner face of the connection shaft portion 14C and the outer face of the connection shaft portion 14D contact directly with each other, lubricating oil may be filled between them.

The structure for connecting the driving gear 12D and the joint gear 13D is not limited to the example of the arm driving apparatus 1. For example, the connection shaft portion 14D and the joint gear 13D may be formed separately from each other. Otherwise, the connection shaft portion 14D may be formed integrally with the driving gear 12D.

As depicted in FIG. 4, the joint gear 15D is rotatable around the second axial line Ax2. The joint gear 15D is provided on the support shaft 33 and is rotatable relative to the support shaft 33. The joint gear 15D is lined up with the joint gears 15B and 15C described above in the direction of the second axial line Ax2. The joint gear 15D has a diameter smaller than those of the joint gears 15B and 15C and is positioned closer to the center of the support shaft 33 with respect to the joint gears 15B and 15C. The joint gears 13D and 15D are bevel gears and are kept in engagement with each other. The joint gear 13D and the joint gear 15D may configure a reduction mechanism. For example, the number of teeth of the joint gear 15D may be greater than the number of teeth of the joint gear 13D. This makes it possible to increase the torque of the second arm unit Ar2 around the fourth axial line Ax4. Different from the example of the arm driving apparatus 1, the number of teeth of the joint gear 15D may be equal to the number of teeth of the joint gear 13D.

As depicted in FIG. 3, the joint gear 16D is rotatable around the third axial line Ax3. The joint gear 16D is lined up with the joint gear 16C of the transmission path C in the direction of the third axial line Ax3. The joint gear 16D has an outer diameter smaller than that of the joint gear 16C and is positioned closer to the support shaft 33 with respect to the joint gear 16C. Also the joint gear 16D is a bevel gear and is kept in engagement with the joint gear 15D. In the example of the arm driving apparatus 1, the number of teeth of the joint gear 16D is smaller than the number of teeth of the joint gear 15D. Different from the example of the arm driving apparatus 1, the number of teeth of the joint gear 16D may be equal to the number of teeth of the joint gear 15D or may be greater than the number of teeth of the joint gear 15D. The joint gears 13D, 15D and 16D may not necessarily be bevel gears if they can convert rotation around the first axial line Ax1 into rotation around the third axial line Ax3. For example, the joint gears 13D, 15D and 16D may be face gears.

As depicted in FIG. 5, the second joint J2 provided at the proximal portion of the second arm unit Ar2 has a joint gear 19D. The joint gear 19D is rotatable around the fourth axial line Ax4 that intersects with the third axial line Ax3. In the example of the arm driving apparatus 1, the fourth axial line Ax4 is orthogonal to the third axial line Ax3. The joint gear 19D is connected to the joint gear 16D such that it rotates together with the joint gear 16D of the first joint J1 described hereinabove.

In the example of the arm driving apparatus 1, the first arm unit Ar1 has a connection shaft portion 21D rotatable integrally with the joint gear 16D around the third axial line Ax3. The joint gear 16D is formed integrally with an end portion of the connection shaft portion 21D. The joint gear 16D and the connection shaft portion 21D may be formed separately from each other. As depicted in FIG. 5, the second joint J2 includes a joint gear 18D that is rotatable integrally with the connection shaft portion 21D around the third axial line Ax3. In the example of the arm driving apparatus 1, the joint gear 18D is formed as a separate member from the connection shaft portion 21D and is attached to the other end portion of the connection shaft portion 21D by a fixture (not depicted) such as, for example, a screw. Both of the joint gears 18D and 19D are bevel gears and are kept in engagement with each other. The joint gears 18D and 19D may not necessarily be bevel gears if they can convert rotation around the third axial line Ax3 into rotation around the fourth axial line Ax4. For example, the joint gears 18D and 19D may be face gears or worm gears.

As depicted in FIG. 2, the second arm unit Ar2 has an arm main body 35 extending from the second joint J2. The proximal portion 35a of the arm main body 35 is connected to the joint gear 19D such that the arm main body 35 and the joint gear 19D rotate integrally around the fourth axial line Ax4. In the example of the arm driving apparatus 1, as depicted in FIG. 5, the proximal portion 35a has shaft portions 35b and 35c. The second joint J2 includes the joint holder 34. The joint holder 34 holds the shaft portions 35b and 35c such that the shaft portions 35b and 35c can rotate around the fourth axial line Ax4. The joint gear 19D described above is fitted in a hole formed in the shaft portion 35b and is fixed to the shaft portion 35b by a fixture (not depicted) such as a screw. By this, the arm main body 35 rotates integrally with the joint gear 19D around the fourth axial line Ax4. As a result, if the electric motor 11D is driven, then the driving gear 12D, connection shaft portion 14D, joint gears 13D, 15D and 16D, connection shaft portion 21D and joint gears 18D and 19D rotate integrally to implement a movement of the second arm unit Ar2 around the fourth axial line Ax4. It is to be noted that the second joint J2 may include an elastic member (for example, a spring) for assisting a movement of the second arm unit Ar2 around the fourth axial line Ax4.

As described hereinabove, the arm driving apparatus 1 includes a driving source unit P including a plurality of electric motors (11A, 11B, 11C or 11D), an arm Ar including a joint J1 connected to the driving source unit P, a first transmission path (A, B, C or D) provided on the arm Ar for transmitting rotation of the electric motor (11A, 11B, 11C or 11D), and a second transmission path (A, B, C or D) provided in the arm Ar for transmitting rotation of the electric motor (11A, 11B, 11C or 11D). The first transmission path includes a first joint rotation member provided in the joint J1 of the arm Ar and rotatable around a first axial line Ax, and a first connection unit rotatable around the first axial line Ax1 and connected to the first joint rotation member for transmitting rotation of the first electric motor to the first joint rotation member. Here, the first joint rotation member is one of the joint rotation member 13A and the joint gears 13B, 13C and 13D described hereinabove, and the first connection unit is a connection shaft portion connected to the first joint rotation member from among the connection shaft portions 14A, 14B, 14C and 14D described above. The second transmission path includes a second joint rotation member provided in the first joint J1 and rotatable around the first axial line Ax1, and a second connection unit rotatable around the first axial line Ar1 and connected to the second joint rotation member for transmitting rotation of the second electric motor to the second joint rotation member. Here, the second joint rotation member is one of the joint rotation member 13A and the joint gears 13B, 13C and 13D described hereinabove and besides is a member different from the first joint rotation member. For example, in the case where the first joint rotation member is the joint rotation member 13A, the second joint rotation member is one of the joint gears 13B, 13C and 13D. The second connection unit is a connection shaft portion connected to the second joint rotation member from among the connection shaft portions 14A, 14B, 14C and 14D described hereinabove. One of the first connection unit and the second connection unit is disposed on the inner side of the other of the first connection unit and the second connection. Further, the first joint rotation member and the second joint rotation member are lined up in the direction of the first axial line Ax1, and at least one of the first joint rotation member and the second joint rotation member is kept in engagement with a rotation member (15B, 15C or 15D) rotatable around a second axial line Ax2 that intersects with the first axial line Ax.

According to this arm driving apparatus 1, both of the first connection unit and the second connection unit are rotatable around the first axial line. Further, one of the first connection unit and the second connection unit is disposed on the inner side of the other one of the first connection unit and the second connection unit. Since the positions of the two electric motors can be disposed nearer to each other by this, the two electric motors can be collectively disposed, for example, in the body portion of a robot. In the example of the arm driving apparatus 1, the four electric motors 11A, 11B, 11C and 11D are disposed in a circumferential direction around the axial line Ax1. As a result, in comparison with an alternative structure in which, for example, the electric motors are disposed in the arm, the weight of the arm Ar can be reduced and the exercise performance of the arm Ar can be improved. Further, in the arm driving apparatus 1, since at least one rotation member from between the first joint rotation member (13A, 13B, 13C or 13D) and the second joint rotation member (13A, 13B, 13C or 13D) is kept in engagement with the rotation member (15B, 15C or 15D) rotatable around a second axial line Ax2 intersecting with the first axial line Ax1, two movements of the arm can be implemented. For example, a movement of the arm around the first axial line Ax1 and a movement of the arm Ar around the second axial line Ax2 intersecting with the first axial line Ax1 can be implemented.

The present invention is not limited to the arm driving apparatus 1 described above and may be changed in various manners. For example, the arm driving apparatus 1 includes the four transmission paths A, B, C and D. The number of transmission paths may be smaller than four or may be greater than four. Further, the arm driving apparatus 1 has, as a joint rotation member, the joint rotation member 13A and the joint gears 13B, 13C and 13D that rotate integrally with the joint holder 31. However, the arm driving apparatus 1 may not necessarily include the joint rotation member 13A. Further, the arm Ar may not necessarily have the second arm unit Ar2.

The invention claimed is:

1. An arm driving apparatus, comprising:
   a driving source unit including a plurality of motors, each rotatable about a respective motor rotation axis parallel to the axes of the other motors;
   an arm connected to the driving source unit and including a joint connected to the driving source unit, an arm unit having a length extending from the joint, the arm unit being rotatable with the joint about a first joint axis parallel to the motor rotation axes, with the joint about a second joint axis perpendicular to the motor rotation axes, and along the length about a third joint axis perpendicular to the second joint axis;
   first, second and third joint rotation members provided in the joint and rotatable about the first joint axis, each by rotation of a respective one of the plurality of motors;
   a fourth joint rotation member provided in the joint and rotatable about the third joint axis;
   first and second rotation members provided in the joint and rotatable about the second joint axis; and
   first, second and third transmission paths in the arm,
   the first transmission path including the first joint rotation member, and effecting the arm unit rotation with the joint about the first joint axis,
   the second transmission path including the second joint rotation member engaged with the first rotation member, and effecting the arm unit rotation with the joint about the second joint axis,
   the third transmission path including the third joint rotation member engaged with the second rotation member and the second rotation member engaged with the fourth joint rotation member, and effecting the arm unit rotation along the length about the third joint axis.

2. The arm driving apparatus according to claim 1, wherein
   the joint is a first joint,
   the arm includes a second joint connected to the first joint,
   the arm unit is a first arm unit and the length extends between the first and second joints, and
   the arm includes a second arm unit extending from the second joint; and
   the apparatus further includes:
   a fifth joint rotation member, provided in the first joint and rotatable about the first joint axis by rotation of one of the plurality of motors,
   a sixth joint rotation member, provided in the first joint and rotatable about the third joint axis,
   a third rotation member, provided in the first joint and rotatable about the second joint axis, and
   a fourth transmission path in the arm, the fourth transmission path including the fifth joint rotation member engaged with the third rotation member and the third rotation member engaged with the sixth joint rotation member.

3. The arm driving apparatus according to claim 2, wherein
the second arm unit is rotatable with the second joint about a fourth joint axis perpendicular to the third joint axis; and
the apparatus further includes a seventh joint rotation member provided in the second joint and rotatable about the fourth joint axis, and the fourth transmission path further includes the sixth joint rotation member engaged with the seventh joint rotation member and effecting the second arm unit rotation with the second joint about the fourth joint axis.

4. The arm driving apparatus according to claim 1, further comprising a holder unit holding a member including the joint and rotatable around the first joint axis, wherein at least one of the joint rotation members rotatable around the first joint axis is connected to the holder unit and is rotatable around the first joint axis together with the holder unit.

5. The arm driving apparatus according to claim 1, wherein
the arm unit is a first arm unit and the joint is a first joint,
the arm has a second arm unit and a second joint,
the first arm unit is connected to the driving source unit through the first joint, and the second arm unit is connected to the first arm unit through the second joint, and
at least one of the transmission paths transmits power to the second arm unit.

6. The arm driving apparatus according to claim 1, wherein
the driving source unit includes:
a first driving rotation member to which rotation of a first of the motors is inputted and which is connected to the first joint rotation member through a first connection unit; and
a second driving rotation member to which rotation of a second of the motors is inputted and which is connected to the second of the joint rotation member through a second connection unit; and wherein
both of the driving rotation members are rotatable around the first joint axis.

7. The arm driving apparatus according to claim 6, wherein the first driving rotation member and the first joint rotation member are positioned between the second driving rotation member and the second joint rotation member, in a direction along the first joint axis.

8. The arm driving apparatus according to claim 7, wherein the first connection unit is cylindrical, and the second connection unit is disposed on an inner side of the first connection unit.

9. The arm driving apparatus according to claim 8, wherein
the driving source unit includes a third driving rotation member to which rotation of a third of the motors is inputted and which is connected to the third joint rotation member through a third connection unit disposed on an outer side of at least one of the first connection unit and the second connection unit or on an inner side of at least one of the first connection unit and the second connection unit, and
the first, second and third joint rotation members are lined up in a direction of the first joint axis.

10. The arm driving apparatus according to claim 9, wherein the first, second and third motors are disposed such that rotary shafts thereof are directed in a direction along the direction of the first joint axis and are lined up in a circumferential direction around the first joint axis.

11. The arm driving apparatus according to claim 1, wherein at least one of the joint rotation members is a bevel gear.

12. The arm driving apparatus according to claim 2, wherein at least one of the joint rotation members rotatable around the first joint axis, and at least one of the joint rotation members rotatable around the third joint axis, are bevel gears.

* * * * *